United States Patent
Brusseaux

(10) Patent No.: US 7,319,974 B1
(45) Date of Patent: Jan. 15, 2008

(54) VEHICLE PARKING MANAGEMENT METHOD

(75) Inventor: Thierry Brusseaux, Aveney (FR)

(73) Assignee: Schlumberger Systemes, Montrouge (FR)

( * ) Notice: Subject to any disclaimer, the term of this patent is extended or adjusted under 35 U.S.C. 154(b) by 423 days.

(21) Appl. No.: 10/088,448

(22) PCT Filed: Sep. 7, 2000

(86) PCT No.: PCT/FR00/02459

§ 371 (c)(1),
(2), (4) Date: Mar. 15, 2002

(87) PCT Pub. No.: WO01/20558

PCT Pub. Date: Mar. 22, 2001

(30) Foreign Application Priority Data

Sep. 15, 1999 (FR) .................................. 99 11541

(51) Int. Cl.
*G07B 15/00* (2006.01)

(52) U.S. Cl. ............................................ 705/13; 705/1
(58) Field of Classification Search .................. 705/13, 705/1, 5
See application file for complete search history.

(56) References Cited

U.S. PATENT DOCUMENTS

| | | | |
|---|---|---|---|
| 5,266,947 A * | 11/1993 | Fujiwara et al. ........... | 340/932.2 |
| 5,745,052 A * | 4/1998 | Matsuyama et al. ...... | 340/932.2 |
| 5,809,480 A * | 9/1998 | Chasek ........................ | 705/13 |
| 5,845,268 A * | 12/1998 | Moore ...................... | 340/932.2 |
| 5,905,247 A * | 5/1999 | Ilen ............................. | 235/384 |
| 6,112,152 A * | 8/2000 | Tuttle .......................... | 701/115 |
| 6,246,337 B1 * | 6/2001 | Rosenberg et al. ........ | 340/932.2 |
| 6,252,523 B1 * | 6/2001 | Mostrom .................... | 340/928 |
| 6,501,391 B1 * | 12/2002 | Racunas, Jr. .............. | 340/932.2 |
| 6,505,774 B1 * | 1/2003 | Fulcher et al. ............. | 235/381 |
| 6,519,329 B1 * | 2/2003 | Hjelmvik .................... | 379/106.01 |

FOREIGN PATENT DOCUMENTS

| | | | |
|---|---|---|---|
| WO | W09320539 | * | 10/1993 |
| WO | WO9627170 | * | 9/1996 |
| WO | WO 9737328 A1 | * | 10/1997 |
| WO | WO 9804080 A1 | * | 1/1998 |
| WO | WO0011616 | * | 3/2000 |

OTHER PUBLICATIONS

"Mobile Telecoms Standards & Approvals Review"; 48Apr. 1999; Phillips Business Information; Dialog file 696, Accession No. 00669312.*

* cited by examiner

*Primary Examiner*—Romain Jeanty
(74) *Attorney, Agent, or Firm*—Osha Liang LLP

(57) ABSTRACT

The invention concerns a method for managing vehicle pay parking, using at least a time recording machine connected to a parking server. The invention is characterised in that since said time recording machine and mobile telephones are quipped with short-distance communication means: a user, provided with at least one of said mobile telephones, transmits to the time recording machine at least: data concerning the user's identity, data concerning parking time; the time recording machine supplies to means controlling parking authorisation, at least data concerning parking time; the time recording machine supplies to the parking server, said data concerning the user's identity and the specific parking fee to be paid, at least, based on data concerning parking time, to charge the user.

14 Claims, 1 Drawing Sheet

VEHICLE PARKING MANAGEMENT METHOD

FIELD OF THE INVENTION

This invention concerns a vehicle paying parking management method using at least one ticket machine connected to a parking server.

A particularly advantageous application of the invention lies in the field of car parks with ticket machines.

A paying parking management system built around a mobile telephone network is known, especially through the international request WO 96/11453, in which a user calls on his mobile telephone a parking server to indicate to it the chosen parking area, and supply a vehicle identifier such as the registration number, and possibly a personal identification number. The parking server saves the call data as well as the parking start time. When the user leaves the parking location, he calls the parking server again to inform it of his departure. Considering the parking duration and the rate applicable in the parking area, the server can calculate the price to be paid by the user and make out a bill either directly, or via the mobile telephone operator. In this known system, the check is carried out by surveillance staff equipped with portable devices enabling them to consult the parking server by telephone link in order to find out whether the parked vehicles, identified in particular by their registration numbers, have been properly saved in the server.

Although it offers a certain number of advantages, the paying parking management system which has just been described nevertheless presents some disadvantages.

For the system user, he is obliged to make, and therefore pay for, two telephone calls to the server, which may be very costly in comparison with the average parking price. For the parking operator, he requires surveillance staff carrying special equipment which is expensive to run since it requires a telephone call from the parking server. In addition, this surveillance work is extremely long since for each vehicle, the identifier, registration number or identification number written on a label placed visibly on the vehicle must be entered.

BACKGROUND OF THE INVENTION

In addition, this known paying parking management system is not compatible with the existing payment systems, such as the fleets of ticket machines issuing a parking ticket to be placed behind the vehicle windscreen or supplying a listing of the parking space numbers or registration numbers of the parked vehicles entered in the ticket machines by the users. The result is either a loss of information or the need to use more sophisticated software if financial or statistical reports are to be produced for the whole system.

Lastly, if the user forgets to indicate his departure to the server, the parking time continues to run, resulting inevitably in disputed bills.

Thus, the technical problem to be solved by the present invention is to propose a vehicle paying parking management system, using at least one ticket machine connected to a parking server, a method which would enable the means of mobile telephony to be applied to the field of paying parking without, however, presenting the disadvantages mentioned above.

SUMMARY OF THE INVENTION

The solution of the technical problem posed consists, according to this invention, in that, the said ticket machine and mobile telephones being equipped with short distance communication means:

- a user, equipped with one of the said mobile telephones, transmits to the ticket machine at least:
  - information concerning the user's identity,
  - information concerning the parking time,
- the ticket machine supplies to parking authorisation control means, at least, the information concerning the parking time,
- the ticket machine supplies to the parking server the said information concerning the user's identity and the parking cost to be paid calculated, at least, using information concerning the parking time, in order to bill the user.

There are in fact systems, such as the system known as "Bluetooth", which enable GSM type mobile telephones for example to communicate over limited distances, approximately 100 m, with computer equipment on a frequency different from that generally used for the long distance communication. Since these short distance calls are free, the immediate advantage of the method according to the invention is that the user does not have to pay for telephone calls with the parking server as in the system described in the above-mentioned international patent request.

It can also be seen that, in the method according to the invention, the ticket machine holds the parking time information required for the check and that, consequently, the said parking authorisation control means can be simpler and less costly than a telephone link with the parking server.

According to a first mode of realisation of the invention, the said parking authorisation control means consist of a parking ticket printed by the ticket machine to be placed inside the vehicle and showing at least the information concerning the parking time. This is the normal use of a ticket machine in its function of issuing a parking ticket.

According to a second mode of realisation of the invention, the said parking authorisation control means consist of a listing supplied by the ticket machine or by a portable control device, able to receive information from the ticket machine. In this latter case, the portable control device receives the information from the ticket machine either by an infrared link or by a short distance radio link. Since these links are free, they do not generate additional communication costs.

Lastly, it can be seen that the method according to the invention is effectively like a new means of payment on a ticket machine and that, consequently, it is compatible from the accounting and statistical point of view with the existing fleets of tickets machines.

BRIEF DESCRIPTION OF THE DRAWINGS

The following description made with reference to the accompanying drawings, given as non-limiting examples, makes it easy to understand what the invention consists in and how it can be realised.

DETAILED DESCRIPTION

Figure 1:
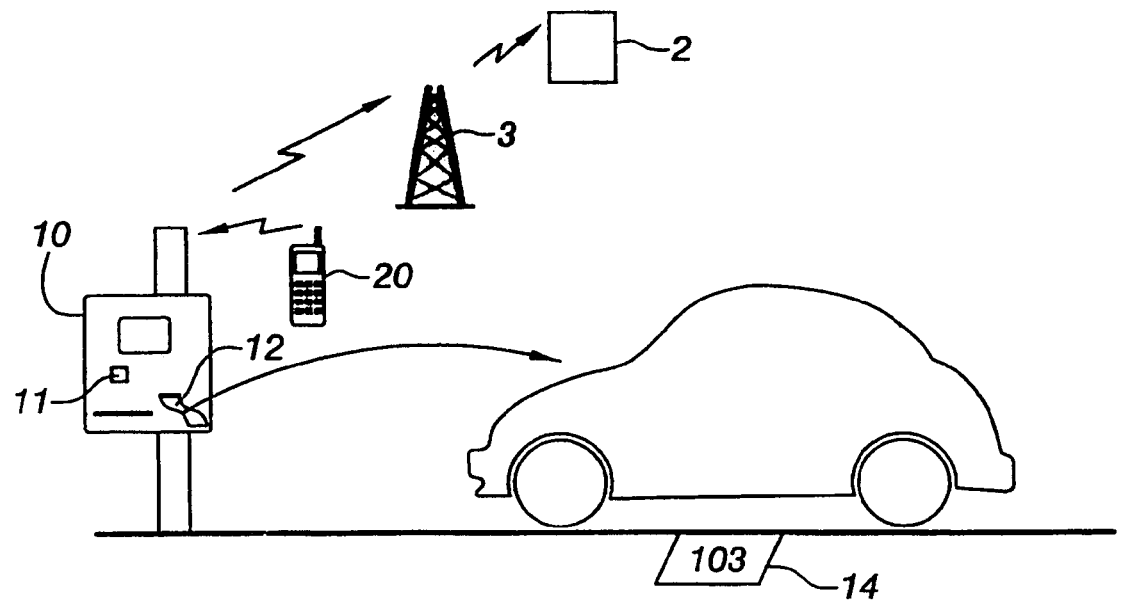
FIG. 1 is a diagram of a first mode of realisation of the method according to the invention.

The diagram of FIG. 1 illustrates a vehicle paying parking method, using at least one ticket machine 10.

This ticket machine 10 is part of a parking system managed by a server 2 and to which it is connected for example via a telephone network 3.

In addition, the ticket machine 10 is equipped with a "Bluetooth" type interface enabling it to communicate free of charge and over short distance with at least one mobile telephone 20 capable of making such communications.

According to the paying parking method shown in FIG. 1, a user, equipped with the mobile telephone 20, goes in front of the ticket machine 10 and presses, possibly, a key 11 so that the ticket machine can receive a short distance communication. The user then enters on his telephone 20 a message including information about the user's identity and information concerning the parking time. This message is transmitted to the ticket machine 10 according to the short distance communication mode.

Using the information received from the mobile telephone 20, the ticket machine 10 calculates a certain number of parameters, such as the end of authorised parking time and the parking price to be paid by the user according to the applicable rates. The ticket machine 10 can then print a ticket 12 which acts as parking authorisation control means. The ticket 12 indicating for example the end of authorised parking time and date is placed inside the vehicle visibly, to allow a visual check by the surveillance staff.

The parking price is stored in a memory of the ticket machine 10 and communicated periodically to the parking server 2 for compensation. The user receives a bill for the amount of this sum which he must pay directly to the parking operator.

Other modes of payment can be considered such as debiting a prepaid account opened with the operator of the parking server 2. To recharge his account, the user buys a 100F prepaid parking scratch card for example, calls the ticket machine with his mobile telephone and enters the number written on the scratch card, the information is then transmitted to the parking server in order to credit the user's prepaid account with 100F.

Obviously, instead of supplying to the ticket machine 10 a parking duration, the user could supply directly the price of parking he wants to pay, the ticket machine converting this price into a parking duration according to the applicable rate.

If the same ticket machine 10 is likely to cover several parking areas with different rates, then the user must indicate to the ticket machine the area where his vehicle is, in the form of information concerning the vehicle parking location, in particular a number 14 characteristic of the rate area of the parking location, in this case the number "103", of the parking space. Using this number the ticket machine will be able to calculate which rate to apply. An indication of the rate applied will be shown on the ticket 12 issued by the ticket machine 10.

Figure 2:
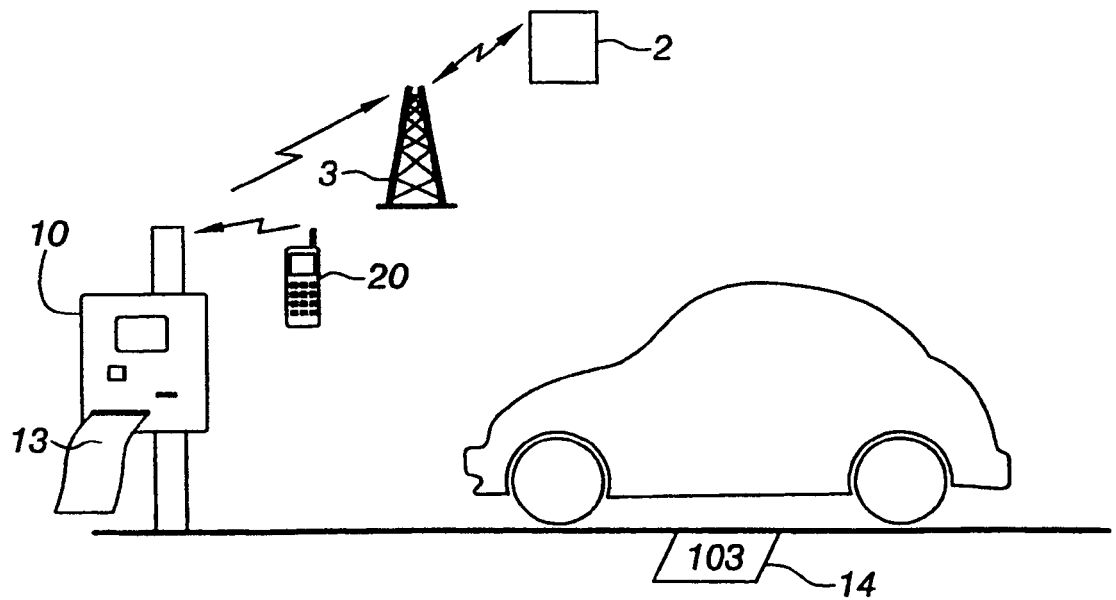
FIG. 2 is a diagram of a second mode of realisation of the method according to the invention.

The mode of realisation of the method according to the invention represented on FIG. 2 differs from that of FIG. 1 in that the user, on arrival to the parking location, transmits to the ticket machine 10 with his mobile telephone 20 not only the information concerning the user's identity and the information concerning the parking time, duration or price as previously, but also information identifying the parked vehicle, such as the vehicle registration number, an identification number affixed on the vehicle (for example, the user's subscription number to the paying parking system) or a number 14 characteristic of the parking space, which can be used if necessary to identify the rate area.

The check is carried out as follows. Upon request by a member of the surveillance staff, the ticket machine 10 supplies a parking authorisation check listing 13 which indicates the information identifying the parked vehicle, registration or identification number, and the information concerning the parking time, duration and parking start time.

The user is billed as in the mode of realisation represented on FIG. 1.

According to an advantageous variant of the mode of realisation of the method on FIG. 2, the user sends a first short distance telephone message to the ticket machine 10 including information concerning the parking time not as duration or price but only the parking start time. During a check, the listing 13 supplied by the ticket machine 10 to a member of the surveillance staff will indicate whether the vehicle identified by its registration number, its identification number or its parking space number is authorised to park from the said parking start time.

When the user decides to leave his parking space, he sends a second telephone message to the ticket machine 10 including information concerning the identification of the parked vehicle and the parking end time. During a check, the listing 13 will have removed the vehicle identification from the parking end time, indicating that the corresponding vehicle is no longer authorised to park.

The price to be paid by the user is calculated using the applicable rate, deduced from the information concerning the parking location and the parking duration obtained by the difference between the parking start and end times.

Note that, in this mode of realisation, the user pays for the true parking time, whereas in the example illustrated in FIG. 1, the parking is prepaid for a given fixed duration.

The paying parking method, subject of the invention, has been described with respect to FIG. 2 by implementing a listing 13 as parking authorisation control means. Obviously, other means could be used, such as a portable device, able to receive information from the ticket machine 10 by an infrared link or by a short distance radio link, as already indicated above.

It is also planned that the ticket machine 10 sends to the mobile telephone 20 an electronic certificate calculated at least using information concerning the user, such as his subscriber number or his account number, information concerning the identification of the parking location and information concerning the parking time. This certificate is stored in the memory of the telephone or in that of the SIM card. If there is sufficient memory, several certificates (10 for example) can be stored in a cyclic file.

This certificate acts as a receipt for the user to prove his payment in case of fine or other difficulty. He can then go to the operator of the parking system with his mobile telephone and prove that he has paid using the certificate stored in memory. This certificate also acts as a reminder to the user of the end of authorised parking time.

What is claimed is:

1. Vehicle paying parking management method using at least one ticket machine connected to a parking server, said method comprising the following steps:
   a first step in which a user, equipped with a mobile telephone equipped with short distance communication means, transmits to the ticket machine, using the short distance communications means, at least: information concerning user's identity, and information concerning a parking time, wherein the ticket machine is located a short distance from the mobile telephone, a second step in which the ticket machine supplies to parking authorisation control means, at least, the information concerning the parking time, and a third step in which the ticket machine supplies to parking server said information concerning the user's identity and a parking cost to be paid calculated, at least, using the information concerning the parking time received from the mobile phone, in order to bill the user.

2. The method according to claim 1, characterised in that the information concerning the parking time consists of a parking duration or price defined by the user.

3. The method according to claim 1, characterised in that the said parking authorisation control means consists of a parking ticket printed by the ticket machine to be placed inside the vehicle and showing at least the information concerning the parking time.

4. The method according to claim 1, characterised in that the user also transmits to the ticket machine information concerning the identification of the vehicle parking location and in that the ticket machine also supplies to said parking authorisation control means said information concerning the identification of the vehicle parking location.

5. The method according to claim 1, characterised in that the user also supplies to the ticket machine information identifying a parked vehicle.

6. The method according to claim 5, characterised in that the information identifying the parked vehicle consists of the vehicle registration number, and identification number affixed on the vehicle or a number characteristic of the vehicle parking space.

7. The method according to claim 5, characterised in that the information concerning the parking time consists of a parking duration or price defined by the user.

8. The method according to claim 5, characterised in that the information concerning the parking time consists of the parking start time and the parking end time respectively sent to the ticket machine on the arrival and departure of the vehicle to/from the parking space.

9. The method according to claim 5, characterised in that the said parking authorization control means consists of a list supplied by the ticket machine or by a portable control device, able to receive information from the ticket machine.

10. The method according to claim 1, characterised in that the information concerning the identification of the vehicle parking locations also includes a number characteristic of a rate area of the parking location.

11. The method according to claim 1, characterised in that the ticket machine send to the mobile telephone an electronic certificate calculated at least using information concerning the user, information concerning the vehicle parking location and information concerning the parking time.

12. The method according to claim 1, characterised in that the parking price is debited from a prepaid account opened with an operator of the parking server.

13. The method according to claim 12, characterised in that said prepaid account is rechargeable, using a prepaid scratch card.

14. The method according to claim 1 wherein the short distance communication means comprises Bluetooth.

\* \* \* \* \*

UNITED STATES PATENT AND TRADEMARK OFFICE
CERTIFICATE OF CORRECTION

| | | |
|---|---|---|
| PATENT NO. | : 7,319,974 B1 | Page 1 of 1 |
| APPLICATION NO. | : 10/088448 | |
| DATED | : January 15, 2008 | |
| INVENTOR(S) | : Thierry Brusseaux | |

It is certified that error appears in the above-identified patent and that said Letters Patent is hereby corrected as shown below:

In the Claims:

In Claim 6, column 5, line 29, "and" should be --an--.

Signed and Sealed this

Third Day of March, 2009

JOHN DOLL
*Acting Director of the United States Patent and Trademark Office*